US010493677B2

(12) United States Patent
Martin et al.

(10) Patent No.: US 10,493,677 B2
(45) Date of Patent: Dec. 3, 2019

(54) OVERMOLDED INSERTS AND METHODS FOR FORMING THE SAME

(71) Applicant: SOLVAY SPECIALTY POLYMERS USA, LLC, Alpharetta, GA (US)

(72) Inventors: Philippe Martin, Moxhe (BE); Michel Magdelyns, Dongelberg (BE)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 201 days.

(21) Appl. No.: 15/528,238

(22) PCT Filed: Nov. 17, 2015

(86) PCT No.: PCT/EP2015/076756
§ 371 (c)(1),
(2) Date: May 19, 2017

(87) PCT Pub. No.: WO2016/079083
PCT Pub. Date: May 26, 2016

(65) Prior Publication Data
US 2017/0334111 A1    Nov. 23, 2017

(30) Foreign Application Priority Data
Nov. 21, 2014 (EP) .................................... 14194221

(51) Int. Cl.
*B29C 45/14*    (2006.01)
*B29C 65/66*    (2006.01)
(Continued)

(52) U.S. Cl.
CPC .. *B29C 45/14598* (2013.01); *B29C 45/14819* (2013.01); *B29C 65/66* (2013.01);
(Continued)

(58) Field of Classification Search
CPC ..... B29C 65/66; B29C 65/665; B29C 61/006; B29C 2045/14893; B29C 45/14598
See application file for complete search history.

(56) References Cited

U.S. PATENT DOCUMENTS 4,011,819 A  *  3/1977  Kessler ............. B29C 45/14344
                                                    244/131
4,588,542 A  *  5/1986  Pierce ................. B29C 44/0407
                                                    152/323
(Continued)

FOREIGN PATENT DOCUMENTS

CN    101245802 A       3/2008
EP     0276593 A1  *  8/1988  ............. B22D 19/00
(Continued)

OTHER PUBLICATIONS

Mörwald K: "Einblick in die Konstruktion von Spritzgusswerkzeugen", Kunststoff Rundschau, Verlag Fur Publizitaet. Isernhagen HB/Hannover, DE, Jan. 1, 1962 (Jan. 1, 1962), No. 1, pp. 8-14, XP009050568.

*Primary Examiner* — Atul P. Khare
(74) *Attorney, Agent, or Firm* — Jarrod N. Raphael; Helene Laville (57) ABSTRACT

Overmolded inserts and methods for forming the same The present disclosure is directed to overmolded inserts (100) with reduced internal residual stress and corresponding methods for forming the overmolded inserts. The overmolded inserts have a polymer housing; metal or metal allow tapered insert (104, 302) and a compression element (106, 304) disposed between the housing and the distal end of the tapered insert. During formation, the tapered insert and compression element are placed within a mold. The polymer housing material is heated and filled into the mold. As the polymer housing cools, the compression element is compressed between the polymer housing and the tapered insert. The overmolded inserts formed have reduced internal (Continued)

residual stress relative to a corresponding insert formed from non-tapered insert.

11 Claims, 5 Drawing Sheets

(51) Int. Cl.
*B29L 23/00* (2006.01)
*B29C 61/00* (2006.01)
*B29L 31/26* (2006.01)
*B29L 31/24* (2006.01)
*B29K 705/00* (2006.01)
*B29K 81/00* (2006.01)

(52) U.S. Cl.
CPC .......... *B29C 65/665* (2013.01); *B29C 61/006* (2013.01); *B29C 2045/14893* (2013.01); *B29K 2081/04* (2013.01); *B29K 2705/00* (2013.01); *B29K 2995/0048* (2013.01); *B29L 2023/00* (2013.01); *B29L 2031/24* (2013.01); *B29L 2031/26* (2013.01)

(56) References Cited

U.S. PATENT DOCUMENTS

| | | | | |
|---|---|---|---|---|
| 5,435,865 | A | * | 7/1995 | Lee .................... B29C 63/44 |
| | | | | 156/213 |
| 6,607,684 | B1 | * | 8/2003 | Lee .................... A63H 3/46 |
| | | | | 264/230 |
| 8,277,714 | B1 | | 10/2012 | Blue et al. |
| 2009/0163101 | A1 | * | 6/2009 | Wu .................... B29C 45/14811 |
| | | | | 442/327 |
| 2010/0230283 | A1 | | 9/2010 | Fanselow et al. |
| 2014/0308469 | A1 | * | 10/2014 | Aida ................ B29C 45/14434 |
| | | | | 428/38 |

FOREIGN PATENT DOCUMENTS

| | | | | | |
|---|---|---|---|---|---|
| JP | 59064150 | A | * | 4/1984 | ........... B22D 19/14 |
| JP | 01225523 | A | * | 9/1989 | ........... B29C 45/14 |
| JP | 06246782 | A | * | 9/1994 | |
| JP | 2005014541 | A | * | 1/2005 | ........... B29C 65/665 |
| JP | 2008213260 | A | * | 9/2008 | |
| WO | 2010006860 | A1 | | 1/2010 | |

* cited by examiner

OVERMOLDED INSERTS AND METHODS FOR FORMING THE SAME

CROSS-REFERENCE TO RELATED APPLICATIONS

This application claims priority to European patent application No. 14194221.9, filed Nov. 21, 2014, the whole content of this application being incorporated herein by reference for all purposes.

FIELD OF THE INVENTION

The invention relates to overmolded inserts with reduced residual internal stress and method for forming the same. In particular, the invention relates to overmolded inserts with a tapered insert and a compression element that, in conjunction, reduces the residual internal stresses in the overmolded inserts.

BACKGROUND OF THE INVENTION

Overmolded inserts generally involve a plastic housing molding around an insert. In some embodiments, the insert can provide an attachment point between the plastic molding and another article. For example, in plumbing applications, plastic pipes or fittings can be molded over inserts comprising threads. Supply or drainage lines or plumbing fixtures having a threaded end can be connected to the insert via the threads to provide fluid flow between the supply or drainage line and the plastic pipe. As an additional example, a plastic handle can be molded over a metal insert comprising threads to engage, for example, a tool or cookware (e.g., a pan or a pan).

SUMMARY OF THE INVENTION

In a first aspect, the invention pertains to a method for forming an overmolded insert. The method includes providing a mold having a tapered insert and compression element disposed therein. The tapered insert includes a metal or metal alloy and a taper having a larger width towards a distal end of the tapered insert. The compression element is disposed adjacent the distal end of the tapered insert. The method further includes filling the mold with a first polymer composition at a first temperature to form a housing and cooling the housing. The cooling compresses the compression element between the housing and the distal end of the tapered insert. The first temperature is above the softening temperature of the polymer composition and the softening temperature of the compression element is about 40% to about 160% of the softening temperature of the first polymer composition. The overmolded insert includes a channel extending from an opening at a first end of the housing and into the tapered insert.

In a second aspect, the invention pertains to an overmolded insert including a housing having a first polymer composition and a tapered insert having a taper with a larger width towards a distal end of the tapered insert (104, 302), where the tapered insert comprising a metal or a metal alloy. The overmolded insert further includes a compression element having a metal, a metal alloy or a second polymer composition disposed between the housing and the distal end of the tapered insert and also includes a channel extending through an opening in the housing and into the tapered insert. The softening temperature of the compression element is about 40% to about 160% of the softening temperature of the first polymer composition.

BRIEF DESCRIPTION OF THE DRAWINGS

FIG. 1(*a*) is a schematic representation of a perspective view of a part having an overmolded insert.

FIG. 1(*b*) is a schematic representation of a perspective view of the part of FIG. 1(*a*) with a portion of the housing removed.

FIG. 1(*c*) is a schematic representation of a side view cross section of the pipe of FIG. 1(*a*).

FIG. 2(*a*) is a schematic representation of a perspective view of a manifold having an overmolded insert.

FIG. 2(*b*) is a schematic representation of a perspective view of the manifold of FIG. 2(*a*).

FIG. 2(*c*) is a schematic representation of a side view cross section of the manifold of FIG. 2(*a*).

FIG. 2(*a*) is a schematic representation of a cross section a mold having an insert and a compression element.

FIG. 2(*b*) is a schematic representation of a cross section of the mold of FIG. 2(*a*), showing the compression on the insert by the polymer composition during polymer cooling.

FIG. 2(*c*) is a schematic representation of a cross section of the mold of FIG. 2(*b*), depicting the movement of the insert during cooling of the polymer composition.

FIG. 3(*a*) is a schematic representation of a side view cross section of a mold having a tapered insert and a compression element.

FIG. 3(*b*) is a schematic representation of a side view cross section of the mold of FIG. 3(*a*), filled with a polymer composition and depicting the forces on a tapered insert during cooling.

FIG. 3(*c*) is a schematic representation of a side view cross section of the mold of FIG. 3(*b*), depicting the relative movement of an insert during cooling.

FIG. 3(*d*) is a schematic representation of an overmolded insert removed from the mold of FIGS. 3(*a*) to 3(*c*).

FIG. 4(*a*) is schematic representation of a perspective view of a tapered insert having a conical out surface.

FIG. 4(*b*) is a schematic representation of a side view cross section of the tapered insert of FIG. 4(*a*).

FIG. 5(*a*) is a schematic representation of a perspective view of a tapered insert having a truncated pyramidal external surface.

FIG. 5(*b*) is a schematic representation of a proximal view of the tapered insert of FIG. 5(*a*).

FIG. 7(*a*) is a schematic representation of a perspective view of a tapered insert that is tapered along only a portion of its length.

FIG. 7(*b*) is a schematic representation of a side view cross section of the tapered insert of FIG. 7(*a*).

DETAILED DESCRIPTION OF THE INVENTION

The present disclosure is directed to overmolded inserts having surprisingly reduced residual internal stress and methods for making the same. The inserts according to the description herein include a housing and, disposed therein, a tapered insert and a compression element adjacent the distal surface of the tapered insert. As used herein, the distal surface of the tapered insert refers to the end of the insert closest to the point at which the taper starts (where the width of the tapered portion is larger) and the proximal surface of the insert refers to the end of the insert closest to the point that at which the taper ends (where width of the tapered portion is smaller), where the width refers to the extent of the tapered insert in a direction perpendicular to its long axis. The overmolded inserts further include a channel extending through at least a portion of the housing and the tapered insert. The channel permits another article to couple to the overmolded insert via the tapered insert. In some embodiments, the channel can extend through the housing and the tapered insert. In such embodiments, the channel can permit another article to couple to the overmolded insert and/or provide a fluid flow passageway through the overmolded insert. It has been surprising found that the tapered insert, in conjunction with the compression element, can provide overmolded inserts with significantly reduced residual internal stress. In particular, during fabrication of the overmolded insert, the compression element is compressed between the distal surface of the tapered insert and the housing, thereby dissipating a significant portion of the residual stress that would be otherwise present.

The overmolded insert of claim 12, wherein the magnitude of the axial or circumferential residual stress on the housing (102, 312), at room temperature, is from about 50% to about 99.5%, relative to the respective axial or circumferential residual stress on a housing of a corresponding overmolded insert having a conical insert with an external diameter that is substantially similar to the largest external diameter of the tapered insert (104, 302) in a direction perpendicular to a long axis of the tapered insert (104, 302) and wherein the axial or circumferential residual stress is measured at an external surface (110, 308) of the tapered insert (104,302) and at the interface of the tapered insert (104,302) and the housing (102, 312).

Overmolded Inserts

Reference is now made to specific embodiments of overmolded inserts according to the present description. A person of ordinary skill in the art will appreciate that the embodiments are intended to be illustrative and not limiting.

Figures 1A, 1B:
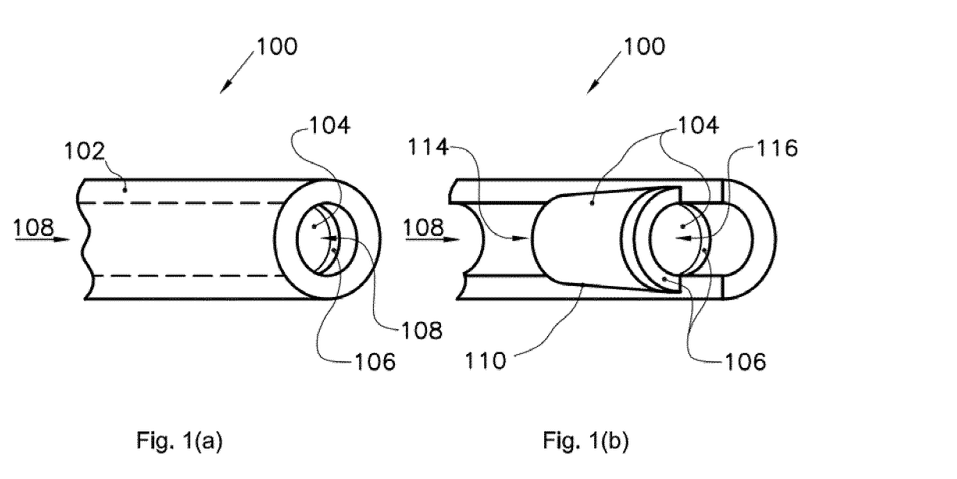
Figure 1C:
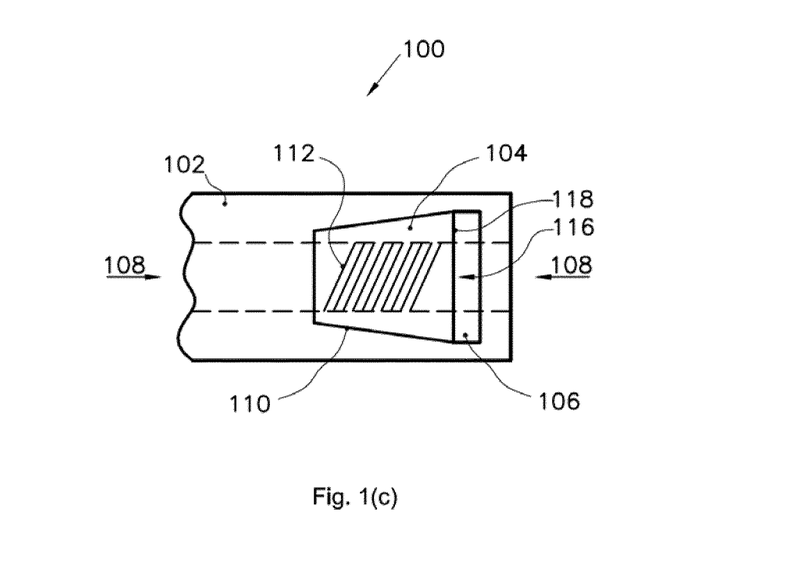

FIGS. 1(a) to 1(c) are schematic representations of an embodiment of an overmolded insert according to the present description. FIG. 1(a) is a schematic representation of a perspective view of a part having an overmolded insert. FIG. 1(b) is analogous to FIG. 1(a), with a portion of the housing removed. FIG. 1(c) is a schematic representation of a cross section of the part of FIG. 1(a). Referring to FIGS. 1(a) to 1(c), overmolded insert 100 includes housing 102, insert 104 and compression element 106. Housing 102 has a channel 108, depicted by broken lines in FIGS. 1(a) and 1(c), that through housing 102, inert 104 and compression element 106. Channel 108 provides a passageway from regions exterior to overmolded insert 100 through overmolded insert 100. Insert 104 includes a tapered external surface 110 and optional fastener 112. Optional fastener 112 provides a connection interface between another article and overmolded insert 100. Other articles (e.g., pipes or plumbing fixtures having a corresponding fastener can be connected to overmolded insert 100 via optional fastener 112 through proximal opening 114 or distal opening 116 of insert 104. In some embodiments, insert 104 can include threads along the length, or a portion thereof, of the internal surface of insert 104. Compression element 106 is compressed between the distal surface 118 of insert 104 and housing 102. When present, optional fastener 112 can include, but is not limited to, threads or a latch fastener.

In general, the housing can form structures including, but not limited to, a pipe, a manifolds, an impeller, a pipe fitting (e.g. a pipe connector), a valve cover or other plumbing fixture, a handle (e.g., for tools or commercial or residential cookware and cooking utensils), a cookware cover (e.g., for commercial or residential cookware), or other articles in which overmolded inserts are used. In some embodiments, the housing can include, or consist essentially of, a polymer composition that is suitable for the intended application setting of the housing. For example, the polymer composition can be selected with respect to the thermal, chemical and/or mechanical loads placed on the housing in its intended application setting. In general, the polymer composition is selected to provide desirable strength and stability in the intended application setting, with regards to thermal, chemical and mechanical loads placed on the housing during use therein. For example, in applications including, but not limited to, plumbing applications, the polymer composition can include, but is not limited to, a polysulfone, a polyethersulfone or a polyphenylsulfone. Desirable polysulfone and polyphenylsulfone compositions are commercial available Udel®, Veradel®, Acudel® and Radel®, respectively, from Solvay Specialty Polymers, LLC (Alpharetta, Ga.). Polysulfones and polyphenylsulfone composition can have a softening temperature of between about 180° C. to about 220° C. As explained below, the compression element composition can be selected based at least in part on the softening temperature of the polymer composition.

As used herein, "softening temperature" refers to the glass transition temperature or the melting temperature, depending on the composition of the polymer composition being described. A person of ordinary skill in the art will recognize that amorphous polymer compositions have a glass transition temperature and no melting temperature; semicrystalline polymer compositions have both a glass transition temperature and a melting temperature; and crystalline polymer compositions have a melting temperature and no glass transition temperature. Correspondingly, the softening temperature of an amorphous polymer compositions refers to the glass transition temperature of the polymer composition; the softening temperature of a semicrystalline polymer composition refers to the higher of the glass temperature and the melting temperature; and the softening temperature of a crystalline polymer composition refers to the melting temperature of the composition.

The tapered insert can provide an interface between the overmolded insert and another article. The tapered inserts described herein include a channel extending into at least a portion of the tapered insert. In some embodiments, the channel can also extend through the length of the tapered insert (e.g. channel 108). The channel extending through the insert can receive another article, or portion thereof, into the channel from a region exterior to the housing. For example, the channel can receive a shaft (e.g. pump shaft, screw or bolt) and the overmolded insert can rotate with the shaft or allow the shaft to rotate within insert. In some such embodiments, the insert can be, but is not limited to, a bushing, a bearing, a sleeve or the like. In some embodiments, the overmolded insert 100 can further include a fastener including, but not limited to, threads, a latch or a snap, on the inner surface of the tapered insert and along the length, or portion thereof, of the insert. Another article with a corresponding fastener (e.g., a threaded end or an end with a latch or a snap) can be inserted into the channel extending into the tapered insert and can be attached to the insert via the fastener. The fastener can help ensure the tightness of the connection. In general, because the interface (e.g., the insert) between the overmolded insert and the other article coupled to the housing can be subject to increased mechanical and/or thermal load, the tapered insert and corresponding interface of the other article are metallic. The insert can include or consist essentially of, for example, aluminum, copper, iron, steel, zinc, brass, low lead brass, stainless steel, or any alloy or combination thereof.

In some embodiments, a tapered insert can have a mechanical gasket disposed about the external surface of the tapered insert (e.g., external surface 110 of insert 104) and between the external surface of the tapered insert and the housing. For example, the gasket can be made from ethylene propylene diene monomer ("EPDM") or a fluoroelastomer such as Viton® (commercially available from DuPont) to help secure the conical insert in the housing and to help avoid fluid permeation the interface between the insert and the polymer. In some embodiments, a mechanical gasket can include, but is not limited to an o-ring. In general, an o-ring can form a torus and comprises and elastomer.

The compression element is compressed between the distal surface of the tapered insert and the housing. During fabrication, the compression element is compressed between the distal surface of the tapered insert and the housing. As explained in detail below, the compression of the compression element during fabrication can dissipate a significant amount of residual internal stress on the housing that would otherwise be present in the overmolded insert formed without the compressible element and/or tapered insert. Residual internal stress refers to the stress that remains in the housing after the formation of the overmolded insert. In particular, during formation, a portion of the compressive forces on exerted on the tapered insert by the housing are dissipated by using them to do work on the compressible element (e.g., to compress the compressible element). The results can be overmolded inserts having housings with significantly reduced residual internal stress relative to overmolded inserts without a compression element. In some embodiments, additionally or alternatively to polymer cooling driven compression of the compression element to decrease the residual internal stresses, the compression element can be compressed further after demolding (e.g. removing the overmolded insert from the mold) by exerting an external force on the insert to move it longitudinally in the compression direction, as explained in further detail below.

The channel can extend partially into the overmolded insert or can extend through the overmolded insert. In some embodiments, the channel can be continuous and can extend through a portion of housing and a portion of the tapered insert. In such embodiments, the channel can receive another article into the channel, either from the distal or proximal end of the tapered insert, which can be coupled to the tapered insert, as described above. For example, in such embodiments, the housing can form a handle and the shaft of a tool, cookware, or cooking utensils can be received into the channel and coupled to threads along the inner surface, or a portion thereof, of the insert. In other embodiments, the channel can be continuous and extend through the housing, the tapered insert and the compression element. In such embodiments, the passage can form a fluid flow passage and, furthermore, another article can be received in the channel. In embodiments in which the tapered insert includes a fastening element on the inner surface of the insert, another article having a corresponding fastener can be coupled to the insert via the fastening element. Correspondingly, fluid can flow to or from the other article and though the overmolded insert. For example, channel 108 can be a fluid flow passageway.

The overmolded inserts according to the present description can have significantly reduced residual internal stress relative to corresponding overmolded inserts not incorporating a tapered insert and compression element. In some embodiments, the magnitude of the axial residual stress on the polymer housing can be between about 0.01 mega Pascal ("MPa") to about 12 MPa, or from about 0.1 MPa to about 10 MPa, or from about 0.1 MPa to about 5 MPa, or from about 0.1 MPa to about 2.5 MPa, or from about 0.05 to about 1 MPa, where the axial residual stress is measured on the external surface of the housing, at room temperature, and radially away from the tapered insert. In some embodiments, the magnitude of the circumferential residual stress on the polymer housing can be between about 0.01 mega Pascal ("MPa") to about 12 MPa, or from about 0.1 MPa to about 10 MPa, or from about 0.1 MPa to about 5 MPa, or from about 0.1 MPa to about 2.5 MPa, or from about 0.05 to about 1 MPa, where the circumferential stress is measured on the external surface of the housing, at room temperature, and radially away from the tapered insert. As explained in the Examples, the residual internal stress can be measured using (i) the hole drilling technique according to the ASTM E837 standard or (ii) the chemical method according to the ASTM D7474 standard, both of which are well known in the art. In some embodiments, the overmolded insert can include a tapered insert having a conical external surface along the taper and a channel extending through the overmolded insert, conical insert and the compression element. In such embodiments, the magnitude of the axial and/or circumferential residual stress on the polymer housing, at room temperature, as measured on the external surface of the housing and radially away from the tapered insert can be reduced by between about 50% and about 99.5%, or between about 75% and about 99.5%, or between about 85% and 99.5%, or between about 90% and 99.5%, relative to a corresponding insert having a conical insert with an external diameter that is substantially similar to the largest external diameter of the tapered insert in a direction perpendicular to the length of the insert. A person of ordinary skill in the art will recognize that additional ranges of axial residual stress, circumferential residual stress, and relative reduction of axial and circumferential residual stress, within the explicitly claimed ranges are contemplated and within the scope of the present disclosure. As used herein, room temperature refers to a temperature range from about 20° C. to about 26° C.

Figure 2A:
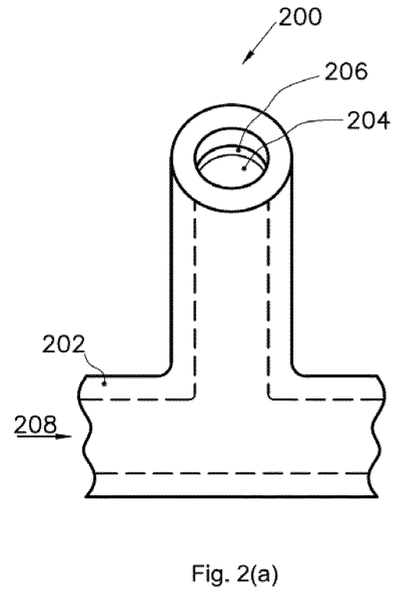
Figure 2B:
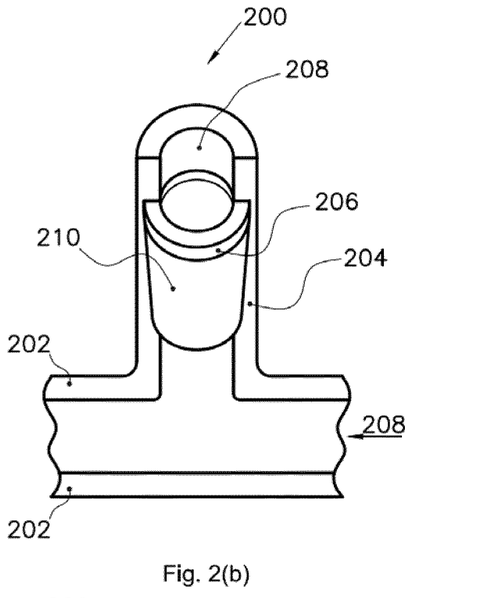
Figure 2C:
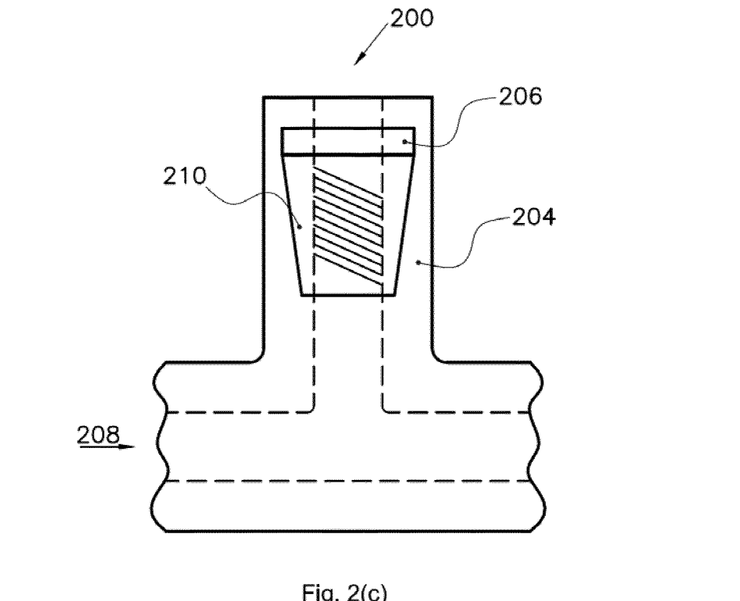

FIGS. 2(a) to 2(c) are schematic representations of manifold having an overmolded insert. FIG. 2(a) is a schematic represent of a perspective view of a manifold having an overmolded insert. FIG. 2(b) is a schematic representation of a perspective view of the manifold of FIG. 2(a) with a portion of the housing removed. FIG. 2(c) is a schematic representation of a side view cross section of the manifold of FIG. 2(a). Referring to FIGS. 2(a) to 2(c), overmolded insert 200 includes housing 202, insert 204 and compression element 206. Housing 202 forms a gas or liquid manifold and channel 208, depicted by broken lines in FIGS. 2(a) and 2(c), extends through housing 202, insert 204 and compression element 206. Channel 208 is a fluid flow channel and permits the flow of fluid (e.g., gas or liquid) to and from regions exterior to overmolded insert 200 through overmolded insert 200. Insert 204 includes a tapered external surface 210 and threads 212. Threads 212 provide a connection interface between another article and overmolded insert 200. In some embodiments, insert 204 can include threads along the length, or a portion thereof, of the external surface of insert 204. While overmolded insert 200 is shown with a single insert, in other embodiments, a manifold can comprises a plurality of overmolded inserts similarly disposed along, and in fluid communication, with channel 208.

Fabrication of Overmolded Inserts

Figure 3A:
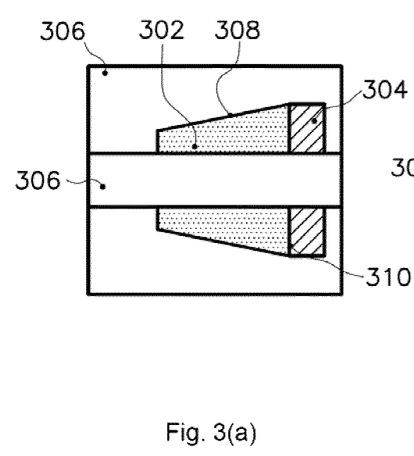

The methods described herein for forming overmolded inserts with reduced residual internal stress include forming a housing over a tapered insert and a compression element disposed adjacent to the tapered insert. The housing is formed at a temperature at or above the softening temperature of the housing composition and the overmolded insert is subsequently cooled to form the final solid part. The cooling of the housing compresses the compression element between the tapered insert and the housing. As explained below, the incorporation of tapered inserts and compression elements of appropriate compositions and relative positioning into the fabrication method can significantly reduce the residual internal stress of overmolded inserts. In some embodiments, during fabrication, the insert can be subjected to compressive forces due to the housing contracting more than the insert as the overmolded insert cools. In such embodiments, at least a portion of the compressive forces can be dissipated by using them to do work on the compression element. In particular, in response to the compressive forces exerted by the housing on the tapered insert, the tapered insert can move relative to the housing and can compress the compression element between the two, thereby dissipating at least a portion of the residual stress that would otherwise be generated in the absence of the compression element. In some embodiments, the compression of the compression element can be aided by the application of and external force on the tapered insert. FIG. 3(a) is a schematic representation of a side view cross section of a mold having a tapered insert and a compression element.

Figure 3B:
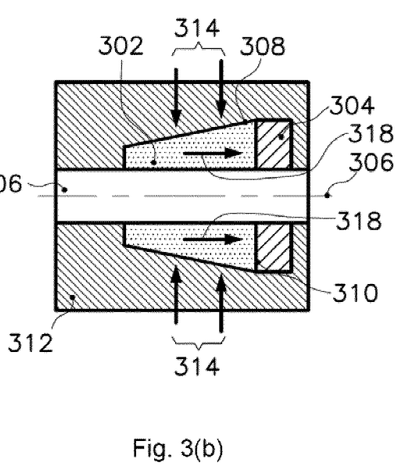
Figure 3C:
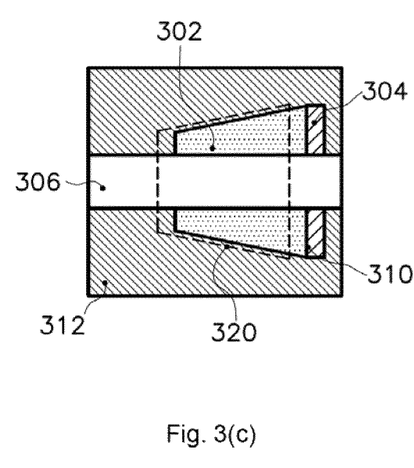
Figure 3D:
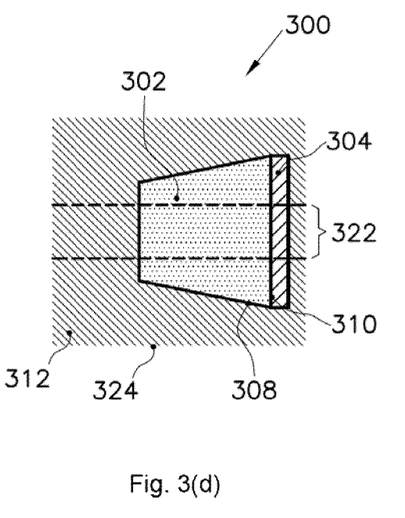

FIGS. 3(a) to 3(d) are schematic representations of one embodiment of a fabrication method for an overmolded insert. FIG. 3(a) is a schematic representation of a side view cross section of a mold having an insert and a compression element. FIGS. 3(b) and 3(c) are schematic representations of a side view cross sections of the mold of FIG. 3(a) depicting, respectively, the forces on and movement of the movement of the tapered insert during cooling. FIG. 3(d) is a schematic representation of a cross section of the overmolded insert removed from the mold of FIGS. 3(a) to 3(c). Referring to FIGS. 3(a) to 3(b), insert 302 and compression element 304 are placed in mold 306. Insert 302 has a tapered external surface 308 (e.g. conical). Compression element 304 is disposed adjacent distal surface 310 of insert 302. Referring to FIG. 3(b), polymer composition 312 is heated, to a processing temperature equal to or greater than its softening temperature, to facilitate processing and filled into mold 306. Polymer composition 312 forms the housing of overmolded insert 300. Mold 306 has an internal surface corresponding to the desired shape of the external surface 324 of overmolded insert 300. As polymer composition 312 cools from its processing temperature to a lower temperature, it contracts more than insert 302 and compresses insert 302 radially inwards, as represented by arrows 314 in FIG. 3(b). Due to tapered external surface 306, insert 302 moves, relatively, along long axis 316 of insert 302. The relative movement of insert 302 is represented by arrows 318 in FIG. 3(b) and the dashed outline 320 in FIG. 3(c). In particular, the dashed outline 320 represents the original position of insert 302 at some prior time during cooling of the polymer composition. Compression element 304 is compressed as a result of the movement of insert 302. FIG. 3(d) shows overmolded insert 300 removed from mold 306. Dashed lines 322 in FIG. 3(d) represent the boundary of the channel formed through overmolded insert 300 by mold 306.

As schematically represented in FIGS. 3(a) to 3(d), the relative movement of an insert, and concomitant compression of the compression element, can significantly reduce the residual internal stress of overmolded elements formed therefrom. Desirable relative movement of an insert can be achieved by selection of appropriate insert geometries, appropriate positioning of the compression element and appropriate compression element compositions. The external shape of the insert is selected such that the insert moves relative to the housing to compress the compression element between the housing and the insert during cooling of the overmolded insert. In general, desirable inserts can have an external surface that is continuously tapered along its length, or a portion thereof. As used herein, the length of the insert refers to its dimension along the long axis of the insert and between the proximal and distal ends of the insert and the width of an insert refers to its dimension perpendicular to the long axis of the insert. Additionally, as used herein, the distal end of the insert refers to the end of the insert closest to the point at which the taper starts (where the cross sectional extent of the tapered portion is larger) and the proximal end of the insert refers to the end of the insert closest to the point that at which the taper ends (where cross sectional extent of the tapered portion is smaller). In some embodiments, the taper can start at the distal end and extend along the length, or a portion thereof, of the insert. Moreover, inserts having a tapered portion with a cross section, in a plane perpendicular to the length of the insert, with an axis of symmetry can be particularly desirable. In particular, such geometries can aid in keeping the relative motion of the insert in a direction along the length and towards the compression element. For the inserts of interest herein, the external surface of the insert can form, but is not limited to, an ellipsoid (e.g., truncated teardrop), a cone (e.g. frusto-conical) or a polyhedron (e.g., truncated prism, parallelepiped or pyramid), that is continuously tapered along the length, or a portion thereof, of the insert.

Figure 4A:
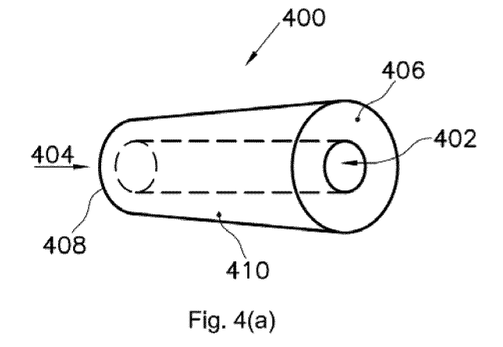
Figure 4B:
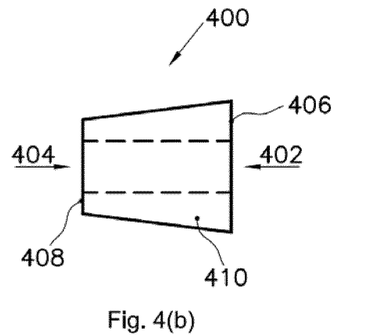
Figure 5A:
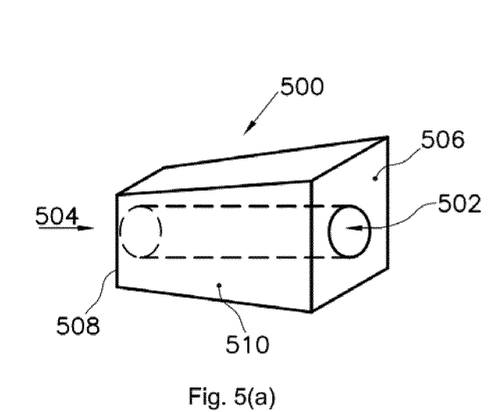
Figure 5B:
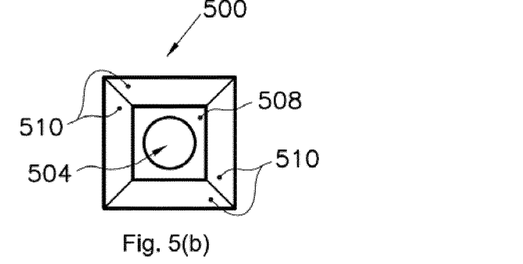
Figure 6:
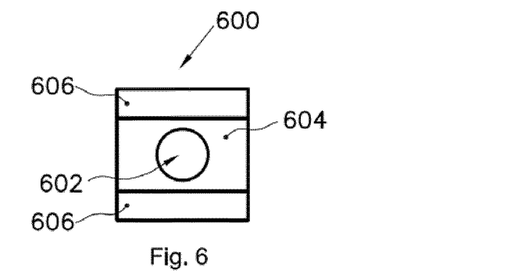
FIG. 6 is a schematic representation of a proximal view of a tapered insert having a truncated pyramidal external surface where two of the sides forming the external surface are parallel and the other two sides forming the external surface are tapered.
Figure 7A:
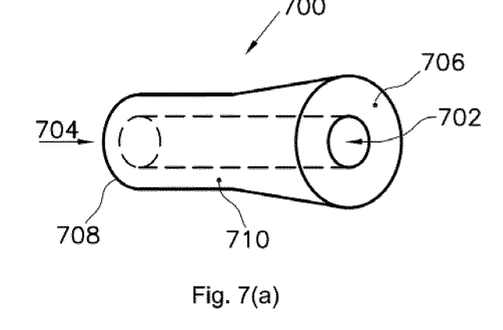
Figure 7B:
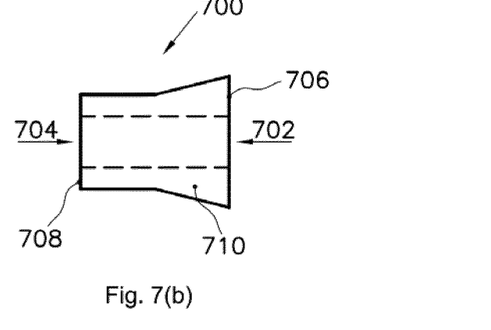

FIGS. 4(a) to 7(b) are schematic representations of embodiments of inserts according to the present description. FIGS. 4(a) and 4(b) are schematic representations of a respective perspective view and side view of an insert 400, having a channel (denoted by the dashed lines) extending along its length with openings 402 and 404 at respective distal surface 406 and proximal surface 408. Insert 400 has conical external surface 410 along its length. FIGS. 5(a) and 5(b) are schematic representations of a respective prospective view and proximal view of an insert 500, having a channel (denoted by the dashed lines) extending along its length with openings 502 and 504 at respective distal surface 506 and proximal surface 508. Insert 500 has a truncated pyramidal external surface 510. FIG. 6 is a proximal view of an insert 600, having a channel extending along its length with an opening at the proximal surface (not shown) and an opening 602 at distal surface 604. Insert 600 has truncated pyramidal external surface 606, where two of the sides forming external surface 606 are parallel and the other two sides forming external surface 606 are tapered. FIGS. 7(a) and 7(b) are schematic representations of a respective perspective view and side view of an insert 700, having a channel (denoted by the dashed lines) extending along its length with openings 702 and 704 at respective distal surface 706 and proximal surface 708. Insert 700 is tapered only along a portion of its length. In particular, external surface 710 is conical throughout the distal portion of insert 700 and cylindrical throughout the proximal portion of insert 700. While not shown in FIGS. 4(a) to 7(b) for clarity, the inserts therein can include threads on the inner surface (e.g., the surface defining the channel) or outer surface along the length, or portion thereof, of the insert, as described in detail above. Similarly, while the inserts shown in FIGS. 4(a) to 7(b) have a channel extending along the entire length of the insert, in other such embodiments, the channel can extend continuously only through a portion of the length of the insert, as described in detail above.

As was mentioned above, fabrication of overmolded inserts with reduced residual internal stress can be achieved, in part, by the appropriate relative positioning of the compression element and the insert. In general, the relative position of the compression element is selected such that it is compressed between the housing and the insert as the housing composition cools. In some embodiments, the compression element can be placed between the distal end of the insert and the interior surface of the mold such that when the mold is filled with the polymer housing composition, it fills a space between the compression element and the interior surface of the mold and does not fill the region between the compression element and the distal surface of the insert (e.g., the melted polymer composition flows around the region between the compression element and the distal surface of the insert). In some embodiments, the compression element can be placed adjacent to the distal surface of the insert and spaced away from the interior surface of mold. In such a configuration, during filling of the mold, the polymer housing composition fills the region between the compression element and the interior surface of the mold but does not flow between the compression element and the distal surface of the insert. Upon cooling, within and/or removed from the mold, the relative motion of the insert along its length can compress the compression element, for example, as shown in FIGS. 3(a) to 3(d). In one such embodiment, the compression element can be placed in contact with the distal surface of the tapered insert. In other such embodiment, there may be structures disposed in the region between the distal surface of the insert and the compression element that prohibit the flow of the polymer housing composition in the region between the distal surface of the insert and the compression element.

In some embodiments, the compression element can be shaped similarly to the distal surface of the insert. For example, in embodiments in which the distal surface of the insert is circular (e.g., a conical insert), the surface of the compressible element adjacent the distal surface of the insert can be circular (open or closed) (e.g., the compressible element can form a torus or an open or closed cylinder) (see, e.g., FIGS. 1(a) to 1(c)). As another example, in embodiments in which the distal surface of the insert is rectangular or trapezoidal, the surface of the compressible element adjacent the distal surface of the insert can be respectively rectangular or trapezoidal (open or closed) (e.g., the compressible element can form an open or closed truncated prism, parallelepiped or pyramid). As used herein, an open geometry refers to a geometry with an opening there through and a closed geometry refers to a geometry that does not have an opening there through. For example, an open circle is a ring and a closed circle is a disc. In some embodiments, as described in detail above and below, the insert can include a channel with an opening at the distal and/or proximal surface to receive an article (e.g. a pipe, other plumbing fitting, or other article to which the overmolded insert is to be attached) and/or facilitate fluid flow there through. In embodiments in which there is an opening at the distal surface, the compression element can be shaped such that the opening is unobstructed. In some such embodiments, the compression element can include a channel there through.

While reference above is made to a single compression element, in some embodiments, a plurality of compression elements can also be desirably used. For example, a plurality of compression elements can be used in a stacked configuration, where the compression elements are stacked along the long axis of the insert adjacent the distal surface of the insert. In such an embodiment, the stack of compression elements is, collectively, compressed between the housing composition and the insert during cooling of the overmolded insert. In other embodiments in which a plurality of compression elements are implemented, a plurality of compression elements can be disposed adjacent the distal surface of the insert, for example, where each compression element contacts a distinct portion of the distal surface of the tapered insert.

Additionally, achieving the desired reduced residual internal stress of overmolded inserts involves, at least in part, the appropriate selection of the compression element composition. In particular, the compression element composition can be selected with respect to the fabrication temperatures of the overmolded insert. The fabrication temperatures of an overmolded insert depend, at least in part, upon the composition of the polymer housing. In particular the polymer housing composition has a softening temperature that is above its operating temperatures in the intended application setting of the overmolded insert. During fabrication, the polymer housing composition is heated to a processing temperature above its softening temperature to achieve a desired viscosity for the chosen filling method and permit desirable flow of the composition into a mold. Additionally, the mold is generally kept at an elevated temperature during filling with the polymer housing composition to prevent shock-cooling and/or rapid solidification of the polymer housing composition. The elevated temperature is generally lower than the softening temperature of the polymer housing composition but near enough to the softening temperature of the polymer housing to allow the polymer housing composition to cool gradually and avoid shock cooling.

Accordingly, the composition of the compression element is selected such that it remains soft during at least an initial portion of the cooling so that that it can be reasonably compressed by the relative movement of the insert during compression. Additionally, the composition of compression element is selected to remain desirably rigid during the same portion of time such that it is not undesirably squeezed or ejected during the filling of the housing composition into the mold. For example, the compression element can have a softening temperature less in a selected range about the softening temperature of the housing composition. In some embodiments, the compression element composition can have a softening temperature that is in a range of between about −100° C. to about 100° C., between about −50° C. to about 50° C., or between about −20° C. to about 20° C., relative to the softening temperature of the polymer housing composition. In some embodiments, the compression element can have a softening temperature that is between about 40% to about 160%, between about 70% to about 130%, or between about 80% to about 115% of the softening temperature of the polymer housing. For housing compositions comprising sulfone polymers, the compression element composition can have a softening temperature in a range of between about 150° C. and 280° C. or between about 180° C. and 240° C. A person of ordinary skill in the art will recognize additional softening temperature ranges within the explicitly disclosed ranges are contemplated and within the scope of the present disclosure.

In additional or alternative embodiments, the composition of the compression element can be selected such that the compression element compresses by a selected amount relative to its equilibrium dimension along the direction of compression during fabrication of the overmolded housing. As used herein, the equilibrium dimension refers to the dimension of the compression element within the mold at room temperature and prior to the mold being filled with the heated polymer housing composition. In some such embodiments, the composition of the compression element can be selected such that compression element compresses at least about 0.1%, at least about 0.5%, at least about 1%, at least about 10%, at least about 20%, at least about 50%, from about 0.1% to about 50%, from about 0.1% to about 25%, from about 0.5% to about 10%, from about 0.5% to about 5%, from about 0.1% to about 2% or from about 0.5% to about 1%, relative to its equilibrium dimension along the direction of compression during fabrication. A person of ordinary skill in the art will recognize additional compression ranges within the explicitly disclosed ranges are contemplated and within the scope of the present disclose.

In some embodiments, the compression element can have, or consist essentially of, a metal, a metal alloy or a polymer composition. Metal and metal alloys can include, but not limited to, aluminum, copper, iron, lead, tin, steel, zinc, brass, low lead brass, stainless steel, or any alloy or combination thereof. Desirable polymer composition can include, but are not limited to, polyamides, polyolefins, partially vulcanizate materials, polyesters, or any combination thereof. Notwithstanding the particular compression element composition, the compression element has a softening temperature in a range as described above. A person of ordinary skill in the art will know how select other appropriate compression element compositions based upon the present description.

As explained above, the overmolded inserts described herein are fabricated by filling a mold with the polymer housing composition and allowing the overmolded insert to cool. The mold can be selected to have an internal surface corresponding to the desired external surface of the overmolded insert. For example, for plumbing applications, the internal surface of the mold can correspond to a pipe, fitting, or manifold. In other applications, the internal surface of the mold can correspond to a handle for an article, including but not limited to, a tool or cookware (e.g., pots, pans and utensils). Similarly, also as explained above, the mold can have an internal structure to form a continuous channel extending partially through the housing and partially into the insert, or extending through the through the housing and the insert.

The mold can be filled with the polymer housing compositions by methods that are well known in the art and the person of ordinary skill in the art will know how to select appropriate known methods based on the present disclosure. For example, the polymer housing composition can be injection molded, blow molded, extruded, thermoformed or compression molded into the mold. In general, as explained above, notwithstanding the particular method, the polymer housing composition is heated above its softening temperature to achieve the desired viscosity suitable of the particular method used to fill the mold to form the final part.

The overmolded insert can be cooled from the processing temperature of the polymer housing composition to a lower temperature that is below the softening temperature of the polymer housing composition (e.g., to room temperature), inside the mold, when removed from the mold, or both. With reference to FIGS. 3(a) to 3(d), the overmolded insert can begin to cool within the mold. In some embodiments, the overmolded insert can continue to cool after it is removed from the mold. In such embodiments, after the overmolded insert is removed from the mold, the insert can continue to move relative to the polymer housing and the compression element can continue to compress between the two.

As mentioned above, in some embodiments, the residual stress on the housing of overmolded inserts can be further reduced by application of an external force to the tapered insert. In such embodiments, while the temperature of the compression element is still above its softening temperature, an external force can be applied to the tapered insert along its length and in the direction of the compression element to further compress the compression element. In such embodiments, the forces on the tapered insert due to the contraction of the polymer housing can be further dissipated, in part, and the residual internal stress on the polymer housing can be further reduced. In particular, when the forces on the tapered insert due to contraction of the housing are no longer desirably move the tapered insert relative to the housing, an external force can be applied to the tapered insert to further compress the compression element. In one such embodiment, the portion of the mold forming the channel into the tapered insert can include a fastening element that can be fastened to a fastening element located on the interior surface, or a portion thereof, of the tapered insert. While the compression element is still above its softening temperature, the portion of the mold having the fastening element can be moved in a direction along the length of the tapered insert and towards the compression element and, correspondingly, further compress the compression element. One such embodiment is schematically represented in FIG. 8.

Figure 8:
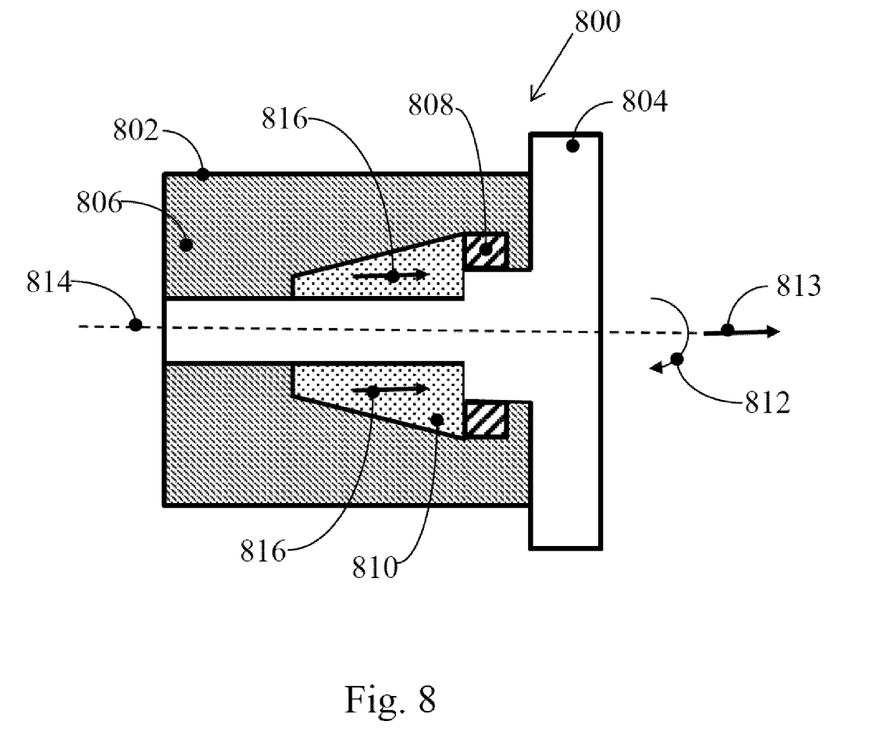
FIG. 8 is a side-view cross section of a mold including a tightening element.

FIG. 8 is a side-view cross section of a mold including a tightening element. Mold 800 includes body 802 and tightening element 804. Body 802 is filled with a polymer composition 806. Tightening element 804 extends through compression element 808 and tapered insert 810. Compression element 808 is at a temperature that is above its softening temperature. Tapered insert 810 includes threads (not shown) along its inner surface that are mated with treads (not shown) along the exterior surface of tightening element 804. Tightening element 804 can be turned or pulled out in the direction noted by, respectively, arrow 812 about long axis 814, or arrow 813, along long axis 814. Turning or pulling the compression element causes the tapered insert to move in a direction denoted by arrows 816. The relative movement of tapered insert 810 can compress the compression element 808 and produce overmolded inserts having reduced residual stress.

Examples

This example demonstrates overmolded inserts having reduced residual stress and corresponding methods for forming.

To demonstrate formation, 4 overmolded insert samples were formed (each of the 4 samples was produced in duplicate to facilitate different methods of stress testing as described below). To form each sample, a molding containing a brass insert and a compression element was filled with a heated polyphenylsulphone composition, which is commercially available under the trade name Radel® from Solvay Specialty Polymers USA, LLC (Alpharetta, Ga.). The compression element was made from the polyacrylamide MXD6, which is commercially available under the trade name IXEF® PARA 1022 from Solvay Specialty Polymers USA, LLC (Alpharetta, Ga., USA). MXD6 is obtained from the polycondensation reaction of m-xylenediamine (MXD) and adipic acid. The insert of sample 1 had a cylindrical external surface (no taper). The inserts of samples 2 to 4 had a conical external surface with a 4 degree taper along the long axis of the insert. The insert of samples 2 to 4 had a length of about 17 mm along its long axis. To fill the mold, the polyphenylsulphone composition was heated to about 385-390° C. to plasticize the composition (e.g., to facilitate introduction of the compositions into the mold), and was subsequently injected into the mold. The mold was maintained at a temperature of about 160° C. during injection to prevent shock cooling of the melted polyphenylsulphone composition. After a period of cooling in the mold, the overmolded insert was removed from the mold and the overmolded insert was allowed to continue to cool to room temperature. After reaching room temperature, the residual stress on the polymer composition (e.g., polymer housing composition) was measured, as described below.

The mold used in fabricating samples 2 to 4 had a body portion and a tightening element forming a channel through the ultimately formed samples. FIG. 8 is representative of the mold used in fabricating samples 2 to 4. The tightening element included threads that were mated with threads along the inner surface of the tapered inserts of samples 2 to 4. For samples 3 and 4, after an initial cooling period in the mold, and while the compression element was still above its softening temperature, the tightening element was turned to further compress the compression element in the mold. During fabrication of samples 3 and 4, the tightening element was turned by half a turn and a full turn, respectively. During fabrication of sample 2, the turning element was not turned and, correspondingly, provided a control for demonstrating the effect of applying an external force to the insert to further compress the compression element.

To demonstrate the reduced residual stress of samples including conical inserts (samples 2 to 4), the residual stress on the samples were measured using a hole drilling technique (according to the ASTM E837 standard) and a chemical technique (according to the ASTM D7474). With respect to the hole drilling technique, the residual internal stress on the polymer housing composition, at the interface between the insert and the housing, was measured axially (along the long axis of the insert) as well as circumferentially (around the circumferences of the insert). For each sample, to test the axial stress and the circumferential stress on the housing, a strain gauge rosette was affixed to the external surface of the housings and radially away from the insert. The strain gauge rosettes were connected to a voltage source. Holes were then drilled (about 2 mm for sample 1 and about 4 mm for samples 2-4) and the strain produced was measured (reflecting the residual internal stress removed during drilling). In particular, the strain on the rosette caused deformation of the rosette which altered the voltage across the rosette. The change is voltage was measured using a voltmeter and the corresponding removed residual stress was calculated. The results are presented in Table 1, below. A person of ordinary skill in the art will recognize that because the residual internal stress is measured at the interface between the insert and the housing, the axial and circumferential stress measurements are effectively invariant to the thicknesses reported in Table 1.

TABLE 1

| Sample No. | Thickness | Insert Type | Movement (mm) | Axial Stress (MPa) | Circumferential Stress (MPa) |
|---|---|---|---|---|---|
| 1 | 2 | Cylindrical | 0 | 14.8 | 16.9 |
| 2 | 4 | Conical | 0 | −0.36 | 0.37 |
| 3 | 4 | Conical | 0.45 | −0.41 | 0.31 |
| 4 | 4 | Conical | 0.9 | −0.78 | 0.12 |

The samples including a conical insert had significantly decreased residual stress relative to the sample having a cylindrical insert. Referring to Table 1, the magnitude of the axial residual stress on the polymer housings of samples 4 to 2 were dramatically reduced by about 94% to about 97% respectively, relative to sample 1. Furthermore, the magnitude of circumferential residual stress on the polymer housings of samples 2 to 4 was reduced by about 98% to about 99% respectively, relative to sample 1. With respect to samples 2 to 4, application of the external force on the inserts to further compress the compression element yielded even further reduced internal stress. In particular, samples 3 and 4 exhibited about a 14% and 117% reduction, respectively, in axial residual stress and about a 16% and 68% reduction, respectively, in circumferential residual stress, relative to sample 2.

With respect to the chemical technique, the samples were sequentially exposed to 4 solutions consisting of 100:0 to 50:50 vol % methyl ethyl ketone ("MEK"):methanol ("MeOH"). In particular, for each sample, the sample was first submerged in a 50:50 solution MEK:MeOH for one minute and then rinsed with water. The sample was then visually inspected for cracked or crazed regions. If cracking or crazing was present, the residual internal stress of the polymer housing was greater than a threshold value (reported in mega Pascal ("MPa")). The threshold value was based upon the concentration of MEK in the solution and reflected the minimum stress level that produces failure in the structural integrity of polymer housing. If cracking or crazing was not present, the residual internal stress of the polymer housing was less than or equal to the threshold value. The process was then repeated for the remaining 3 solutions. In general, the higher the concentration of MEK needed to produce cracking or crazing, the less the residual internal stress on the polymer housing. The results are shown in Table 2. The row labelled "Pressure," indicates the threshold values as discussed above. For example, referring to sample 2 in table 2, the residual internal stress of the polymer housing was greater than about 11.5 MPa but less than or equal to about 14 MPa. Additionally, in Table 2, "N/A" indicates that the sample was not tested at the corresponding conditions.

TABLE 2

| | vol % MEK/vol % MeOH | | | |
|---|---|---|---|---|
| | 100/0 | 85/15 | 75/25 | 50/50 |
| Sample | Pressure (MPa) | | | |
| No. | 8 | 11.5 | 14 | 23 |
| 1 | CR | N/A | CR | OK |
| 2 | N/A | CR | OK | OK |
| 3 | CR | OK | OK | OK |
| 4 | CR | N/A | OK | OK |

Referring to Table 2, the samples having a conical insert (samples 2-4) has less residual internal stress relative to the sample having a cylindrical insert (sample 1), similarly to what was measured using the hole drilling technique as reported in Table 1. It is noted that the chemical method is representative of the residual internal stress level of the complete polymer housing, while the hole drilling method is more localized as described above. Accordingly, the chemical method can be more sensitive to the presence of small defects and, therefore, can result in a higher internal residual stress measurement relative to the hole drilling method.

The embodiments above are intended to be illustrative and not limiting. Additional embodiments are within the inventive concepts. In addition, although the present invention has be described with reference to particular embodiments, those skilled in the art will recognized that changes can be made in form and detail without departing form the spirit and scope of the invention. Any incorporation by reference of documents above is limited such that no subject matter is incorporated that is contrary to the explicit disclosure herein.

Should the disclosure of any patents, patent applications, and publications which are incorporated herein by reference conflict with the description of the present application to the extent that it may render a term unclear, the present description shall take precedence.

The invention claimed is:

1. A method for forming an overmolded insert, the method comprising:
   disposing a tapered insert and a compression element formed of a metal or metal alloy inside a mold,
   wherein the tapered insert comprises a taper increasing in width in the direction of a distal end of the tapered insert, and
   wherein the compression element is disposed adjacent the distal end of the tapered insert in the mold;
   filling the mold with a first polymer composition at a first temperature to form a housing molded over the insert and compression element; and
   cooling the housing from the first temperature,
   wherein the cooling compresses the compression element, relative to the equilibrium dimension of the compression element, between the housing and the distal end of the tapered insert,
   wherein the compression dissipates a significant portion of residual internal stress on the housing during the cooling that would otherwise be present without the compression element, and
   wherein the overmolded insert comprises a channel extending from an opening at a first end of the housing and into the tapered insert.

2. The method of claim 1, wherein a dimension of the compression element in the direction of the compression is reduced from about 0.1% to about 10% relative to the equilibrium dimension in the direction of compression.

3. The method of claim 1, wherein the magnitude of axial or circumferential residual stress on the housing at room temperature is from about 50% to about 99.5% relative to the respective axial or circumferential residual stress on a housing of a corresponding overmolded insert formed using a conical insert having an external diameter that is substantially similar to the largest external diameter of the tapered insert in a direction perpendicular to a long axis of the tapered insert, and wherein the axial or circumferential residual stress is measured at an external surface of the tapered insert and at the interface of the tapered insert and the housing.

4. The method of claim 1, wherein the tapered insert comprises a conical external surface along the taper.

5. The method of claim 1, wherein the first polymer composition comprises a polysulfone or a polyphenylsulfone.

6. The method of claim 1, wherein the housing comprises a pipe, a manifold, an impeller, a pipe fitting, a valve cover, or a plumbing fixture.

7. The method of claim 1, wherein the channel extends through the housing, the tapered insert, and the compression element.

8. The method of claim 1, wherein the opening at the first end of the housing is disposed adjacent the distal end of the tapered insert.

9. The method of claim 1, wherein the filling a mold comprises blow molding, extruding, or injection molding the first polymer composition into the mold.

10. The method of claim 1, wherein the tapered insert comprises a metal or metal alloy.

11. The method of claim 1, wherein the dissipation of residual stress is between about 50% and about 99.5% as measured on the external surface of the housing and radially away from the tapered insert, relative to a corresponding insert formed without using the compression element and having a conical insert with an external diameter that is substantially similar to the largest external diameter of the tapered insert in a direction perpendicular to the length of the insert.

* * * * *